United States Patent
Blumenberg et al.

(12) 
(10) Patent No.: US 6,558,719 B1
(45) Date of Patent: May 6, 2003

(54) FOODSTUFFS SKIN BASED ON CELLULOSE WITH REINFORCED ADHESION TO MINCED MEAT AND A PROCESS FOR ITS PREPARATION

(75) Inventors: Klaus Blumenberg, Walsrode (DE); Willi Neuschulz, Fallingbostel (DE)

(73) Assignee: Wolff Walsrode AG, Walsrode (DE)

( * ) Notice: Subject to any disclaimer, the term of this patent is extended or adjusted under 35 U.S.C. 154(b) by 358 days.

(21) Appl. No.: 09/718,561

(22) Filed: Nov. 22, 2000

(30) Foreign Application Priority Data

Nov. 29, 1999 (DE) .......................... 199 57 454

(51) Int. Cl.⁷ ................................. A23L 1/317

(52) U.S. Cl. ....................................... 426/105

(58) Field of Search ................. 426/105, 138, 426/272, 284

(56) References Cited

U.S. PATENT DOCUMENTS

| | | | |
|---|---|---|---|
| 3,378,379 A | 4/1968 | Shiner et al. | 99/176 |
| 3,743,521 A | 7/1973 | Rasmussen | 99/176 |
| 4,356,200 A | 10/1982 | Hammer et al. | 426/105 |
| 4,463,778 A | 8/1984 | Judd et al. | 138/118.1 |
| 4,563,376 A | 1/1986 | Hammer et al. | 428/36 |

FOREIGN PATENT DOCUMENTS

DE   34 47 026   7/1985

*Primary Examiner*—Keith Hendricks
(74) *Attorney, Agent, or Firm*—Godfried R. Akorli; James R. Franks; Aron Preis

(57) ABSTRACT

A foodstuffs skin based on cellulose with a water vapor impermeable layer on the outer surface and a coating consisting of at least two components on the inner surface is disclosed. The coating which reinforces adhesion to minced meat contains a cross-linked polyaminoamide/-epichlorhydrin resin, and wax as well as an optional synthetic polymer. A process for preparing these foodstuffs skins and their use for the production of sausages for boiling and/or simmering is also described.

12 Claims, No Drawings

FOODSTUFFS SKIN BASED ON CELLULOSE WITH REINFORCED ADHESION TO MINCED MEAT AND A PROCESS FOR ITS PREPARATION

FIELD OF THE INVENTION

The invention provides a tubular foodstuffs skin, in particular, a sausage skin, based on cellulose with a water vapor impermeable layer on the outer surface and a coating on the inner surface for reinforcing adhesion to minced meat; also, the use of these sausage skins and a process for their preparation.

BACKGROUND OF THE INVENTION

Sausage skins with a coating on the inner surface which reinforces adhesion to minced meat are known from DE-A-2 062 594, wherein, here, the use of a sausage skin with an outer moisture-proof layer made of vinylidene resin and an inner coating made of a polyaminepolyamide/-epichlorhydrin resin for sausages of the liver sausage type is described.

DE-A-3030036 describes a tubular packaging skin which has a film coating on the outer surface which is virtually impermeable to water vapor land in which the supporting tube has an adhesion-promoting layer, consisting of a chemical condensation product, firmly adhering to its inner surface, this layer consisting of polyaminepolyamide/epichlorhydrin resin.

In the case of the sausage skins mentioned above, which are coated on the inner surface exclusively with a polyaminepolyamide/epichlorhydrin resin, there is the disadvantage that adhesion to the minced meat (sausage) is not strong enough to avoid the undesirable deposition of fat or jelly between the sausage skin and the sausage. The cutting up, together with the sausage skin, of sausages which are intended to be boiled is an application with a particularly high requirement for adhesion of the skin to the sausage. These sausage discs are presented for sale in see-through packaging, wherein the adhering sausage skin provides the sausage discs with a desirable appearance which promotes sales. Here, the known adhesion-promoting layers, which consist exclusively of polyaminepolyamide/epichlorhydrin resin, are not sufficiently adhesive and unwanted loosening of the sausage skin takes place during the cutting process.

There is, therefore, the object of improving the inner coating of foodstuffs skins based on cellulose in such a way that adhesion between the skin and the minced meat is noticeably reinforced.

SUMMARY OF THE INVENTION

Surprisingly, it was found that the combination of polyamine-polyamide/-epichlorhydrin resin and a wax in the inner coating of these types of sausage skins acts in a synergistic manner to produce strong adhesion to minced meat, whereas, the individual components, when used as the only inner coating, caused only slight adhesion of the skin to the sausage.

Therefore, the invention provides a foodstuffs skin based on cellulose with a water vapor impermeable layer on the outer surface and a coating on the inner surface consisting of at least two components, which reinforces adhesion to minced meat, characterized in that the first component in the coating is a cross-linked polyaminepolyamide/ epichlorhydrin resin, the second component is a wax and the optionally present third component is a synthetic polymer.

DETAILED DESCRIPTION OF THE INVENTION

The sausage comprises a tube made of regenerated cellulose which is preferably reinforced with fleece made of hemp fibres. The manufacture of sausage skins based on cellulose, which are optionally reinforced with fibres and have a water vapor impermeable barrier layer on the outer surface, is performed in a manner known per se. Accordingly, the fleece is shaped into a tube, coated with viscose, regenerated, washed, treated with plasticizer, a bonding agent for the water vapor impermeable film coating is applied, the cellulose regenerated tube is dried and the water vapor impermeable outer layer is applied. Internal modification according to the invention of the regenerate skin is performed before applying the water vapor impermeable barrier layer, preferably before drying the regenerated tube.

Internal modification consists of at least two components, wherein the first component is a cross-linked polyaminepolyamide/epichlorhydrin resin.

Upon drying at elevated temperatures, the optionally partially crosslinked, polyaminepolyamide/epichlorohydrin reacts with the cellulose surface, resulting in an insoluble, fully crosslinked resin.

From among the types of polyaminepolyamide/ epichlorohydrin resins which are commercially available, ®Kymene SLX, manufacturer; the Hercules Co., for example, may be used.

The second component for the internal coating is a wax preferably a naturally occurring wax from the group consisting of carnauba wax, montan wax, candellila wax and beeswax. Polyaminepolyamide/epichlorhydrin resin and wax are present in a weight ratio of 20:1 to 5:1 therebetween. The waxes are preferably used as aqueous dispersions.

The impregnation solution for internal modification of the regenerate skin contains 0.5 to 10, in particular, 1.5 to 5 wt. % of the partially cross-linked polyamine-polyamide/ epichlorhydrin resin and 0.1 to 4, in particular, 0.4 to 3 wt. %, of wax.

In another embodiment, the coating on the inner surface optionally includes, as a third component, a copolymer or a polyvinyl alcohol. The copolymer, used according to the invention, is built up from vinyl acetate and esters of maleic acid. This is offered commercially, for example, under the name ®Vinnapas dispersions (Wacker-Chemie GmbH). From among the various viscosity grades of this product, the type MV 70 H, with a solids content of 50 wt. %, is preferably used for foodstuffs skins according to the invention.

The polyvinyl alcohol optionally used as the third component in the coating on the inner surface of the sausage skin, is preferably a so-called fully hydrolyzed type, which is prepared by the saponification of polyvinyl acetate. These types of products are commercially obtainable, e.g., under the name ®Mowiol (Hoechst AG). From among the various types, which differ in viscosity and degree of hydrolysis, ®Mowiol 28–99, in the form of an aqueous solution with a solids content of 10 wt. %, is preferably used for the foodstuffs skins, according to the invention. The solution is prepared by sprinkling ®Mowiol granules into cold water and then dissolving at 90° C. with stirring.

The impregnation solution for internal modification of the regenerate skin may contain, in addition to the amounts specified above for partially cross-linked polyaminepolyamide/epichlorhydrin resin and wax, as the third component, ®Vinnapas dispersion or ®Mowiol, in a concentration of 0.1 to 4, particularly preferably 0.4 to 3 wt. %, with respect to the pure substance.

The invention also provides use of these sausage skins for producing sausages which are intended to be simmered and/or boiled.

The invention is further illustrated but is not intended to be limited by the following examples in which all parts and percentages are by weight unless otherwise specified.

EXAMPLES

Comparison Examples 1 and 2 each show the effect of the exclusive use of polyaminepolyamide/epichlorhydrin resin or wax dispersion in the impregnation solution, while Example 1 proves the synergistic effect of the combined use of these substances.

The sausage skins used as the base product for providing with an additional coating on the inner surface had been prepared as follows.

As is conventional, a hemp non-woven strip with a cut width in accordance with the nominal diameter was shaped to give a tube and coated on the inside and outside with optionally colored viscose solution. The tube was then passed through the conventional precipitation, washing, plasticizing and primer baths. Preferably, before entrance into the drying shaft, the tube was filled with the impregnation solution mentioned in the particular example and this was then squeezed out using a pair of rollers. Finally, the tube was dried in the blown out state and wound onto a reel. Application of the water vapor impermeable layer to the outer surface took place in a separate process using conventional methods. Sausages of the type needing to be boiled were produced using the final sausage skins and were tested with regard to ease of peeling 2 days later. Adhesion to the minced meat was assessed on a scale from 0 to 5 for increasing adhesion of sausage skin to sausage.

Example 1

During continuous preparation, the inner surface of a black coloured, fibrous skin, viscosed on both sides, with a nominal diameter of 105 in the wet state was treated with an impregnation solution with the following composition:

| | |
|---|---|
| 2580 g | soft water |
| 560 g | glycerine (90 wt. %) |
| 320 g | carnauba wax dispersion (® Michem Lube 160 PFE manufacturer, Michelman Co., 25 wt. %) |
| 1540 g | polyaminepolyamide/epichlorhydrin resin (® Kymene SLX, manufacturer, Hercules Co., 13 wt. %) |

After making the sausage skins, sample sausages were made using minced sausage meat for boiling and then the skins were peeled off 2 days later. The skins exhibited strong adhesion to the sausage with a minced meat adhesion value of 3. Deposits of jelly between the sausage skin and the sausage could not be observed. The surface of the peeled sausage skins was 100% covered with scraps of minced meat, i.e., minced meat which had pulled away from the surface of the sausage.

Example 2

During continuous preparation, the inner surface of a black coloured, fibrous skin, viscosed on both sides, with a nominal diameter of 105 in the wet state was treated with an impregnation solution with the following composition:

| | |
|---|---|
| 2660 g | soft water |
| 560 g | glycerine (90 wt. %) |
| 80 g | copolymer dispersion (® Vinnapas MV 70 H manufacturer, Wacker Co., 50 wt. %) |
| 160 g | carnauba wax dispersion (® Michem Lube 160 PFE manufacturer, Michelman Co., 25 wt. %) |
| 1540 g | polyaminepolyamide/epichlorhydrin resin (® Kymene SLX, manufacturer, Hercules Co., 13 wt. %) |

After making the sausage skins, sample sausages were made using minced sausage meat for boiling and then the skins were peeled off. The skins exhibited strong adhesion to the sausage with a minced meat adhesion value of 3; surface 100% covered with scraps of minced meat. Deposits of jelly between the sausage skin and the sausage could not be observed.

Example 3

During continuous preparation, the inner surface of a black colored, fibrous skin, viscosed on both sides, with a nominal diameter of 105 in the wet state was treated with an impregnation solution with the following composition:

| | |
|---|---|
| 1240 g | soft water |
| 560 g | glycerine (90 wt. %) |
| 1500 g | fully hydrolyzed polyvinyl acetate (® Mowiol 28-99, manufacturer, Hoechst Co., 10 wt. % aqu. soln.) |
| 160 g | carnauba wax dispersion (® Michem Lube 160 PFE manufacturer, Michelman Co., 25 wt. %) |
| 1540 g | polyaminepolyamide/epichlorhydrin resin (® Kymene SLX, manufacturer, Hercules Co., 13 wt. %) |

After making the sausage skins, sample sausages were made using minced sausage meat for boiling and then the skins were peeled off after storage resulting from the method of preparation. The skins exhibited strong adhesion to the sausage with a minced meat adhesion value of 3; surface 100% covered with scraps of minced meat. Deposits of jelly between the sausage skin and the sausage were not present.

Comparison Example 1

During continuous preparation, the inner surface of a black colored, fibrous skin, viscosed on both sides, with a nominal diameter of 105 in the wet state was treated with an impregnation solution with the following composition:

| | |
|---|---|
| 2900 g | soft water |
| 560 g | glycerine (90 wt. %) |
| 1540 g | polyaminepolyamide/epichlorhydrin resin (® Kymene SLX, manufacturer, Hercules Co., 13 wt. %) |

After making the sausage skins, sample sausages were made using minced sausage meat for boiling and then the skins were peeled off 2 days later. The skins exhibited no adhesion to the sausage and the minced meat adhesion value was thus assessed as 0. In addition there were large deposits of jelly between the sausage skin and the sausage.

Comparison Example 2

During the production of sausage skins, the inner surface of a gold colored, fibrous skin with a nominal diameter of 60 was treated with the following impregnation solution:

| | |
|---|---|
| 4120 g | soft water |
| 560 g | glycerine (90 wt. %) |
| 320 g | carnauba wax dispersion (® Michem Lube 160 PFE manufacturer, Michelman Co., 25 wt. %) |

After making the sausage skins, sample sausages were again made using minced sausage meat for boiling and then the skins were peeled off 2 days later. The skins exhibited no adhesion to the sausage so that a minced meat adhesion value of 0 resulted. In addition, there were large deposits of jelly between the sausage skin and the sausage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A foodstuffs skin comprising a tube of regenerated cellulose, a layer impermeable to water vapor positioned on the outer surface of said tube and a coating comprising cross-linked polyaminoamide/epichlorhydrin resin, and wax, positioned on the inner surface of said tube, said coating having adhesion to minced meat greater than a corresponding coating that contains but one of polyaminoamide/epichlorhydrin resin or wax.

2. The skin according to claim 1, wherein said wax is selected from the group consisting of montan wax, carnauba wax, candellila wax and beeswax.

3. The skin according to claim 1, wherein said polyaminoamide/epichlorhydrin resin and wax are present in a weight ratio of 20:1 to 5:1 therebetween.

4. The skin according to claim 1, wherein the coating further contains a member selected from the group consisting of (a) polyvinyl alcohol and (b) a compolymer of vinyl acetate and an ester of maleic acid.

5. The skin according to claim 1, wherein the coating has a weight per unit area of 0.05 to 1.0 $g/m^2$.

6. The skin according to claim 1, wherein the regenerated tube is reinforced with fibers.

7. A process for preparing the skin according to claim 1 comprising, applying an aqueous coating mixture containing 0.5 to 10 wt. % polyaminepolyamide/epichlorhydrin resin and 0.1 to 4 wt. % dispersed wax, said percent weights being based on the weight of the aqueous coating mixture, to the inner surface of said tube.

8. The process of claim 7 wherein the aqueous coating mixture further contains 0.1 to 4 wt. % of a member selected from the group consisting of (a) polyvinyl alcohol and (b) a copolymer of vinyl acetate and an ester of maleic acid.

9. The process of claim 7 wherein the aqueous coating mixture contains 1.5 to 5 wt. % polyaminepolyamide/epichlorhydrin resin and 0.4 to 2 wt. % dispersed wax.

10. The process of claim 9 wherein the aqueous coating mixture further contains 0.4 to 3 wt. % of a member selected from the group consisting of (a) polyvinyl alcohol and (b) a copolymer of vinyl acetate and an ester of maleic acid.

11. A method of using the skin of claim 1 comprising making a sausage product.

12. The sausage prepared by the method of claim 11.

* * * * *